United States Patent
Seifert et al.

(10) Patent No.: US 10,371,816 B2
(45) Date of Patent: Aug. 6, 2019

(54) UPDATING CONTOUR MAPS FOR BODIES OF WATER

(71) Applicants: Sean Seifert, West Fargo, ND (US); Mike Seifert, Bismarck, ND (US)

(72) Inventors: Sean Seifert, West Fargo, ND (US); Mike Seifert, Bismarck, ND (US)

(73) Assignee: Aurora Borealis Dakota L.L.C., Bismarck, ND (US)

( * ) Notice: Subject to any disclaimer, the term of this patent is extended or adjusted under 35 U.S.C. 154(b) by 359 days.

(21) Appl. No.: 14/983,996

(22) Filed: Dec. 30, 2015

(65) Prior Publication Data
US 2017/0192092 A1    Jul. 6, 2017

(51) Int. Cl.
*G01S 15/00*    (2006.01)
*G01S 15/89*    (2006.01)

(52) U.S. Cl.
CPC .................... *G01S 15/89* (2013.01)

(58) Field of Classification Search
USPC .......................................................... 367/88
See application file for complete search history.

(56) References Cited

U.S. PATENT DOCUMENTS

| | | | |
|---|---|---|---|
| 6,256,585 B1 | 7/2001 | Shannon | |
| 7,940,602 B1 | 5/2011 | Korolenko | |
| 8,305,841 B2 * | 11/2012 | Riordan | G01S 15/8902 367/88 |
| 8,417,451 B2 | 4/2013 | Hersey et al. | |
| 8,463,458 B2 | 6/2013 | Wood et al. | |
| 8,510,046 B2 | 8/2013 | Kabel et al. | |
| 8,645,012 B2 | 2/2014 | Salmon et al. | |
| 2010/0141518 A1 * | 6/2010 | Hersey | G01C 13/008 342/357.64 |
| 2010/0157736 A1 * | 6/2010 | Riordan | G01S 15/87 367/88 |
| 2011/0054785 A1 * | 3/2011 | Wood | G01C 21/00 701/533 |
| 2012/0232719 A1 * | 9/2012 | Salmon | G05D 1/0206 701/2 |
| 2012/0290200 A1 * | 11/2012 | Kabel | G01C 21/22 701/409 |
| 2014/0032479 A1 * | 1/2014 | Lauenstein | G06F 17/30241 707/602 |
| 2015/0039222 A1 | 2/2015 | Kabel | |

(Continued)

OTHER PUBLICATIONS

Garmin, LakeVü™ HD Ultra, http://buy.garmin.com/en-US/US/maps/on-the-water-maps/lakevu/u-s-la, accessed on Aug. 3, 2015, 3 pages.

(Continued)

*Primary Examiner* — James R Hulka
(74) *Attorney, Agent, or Firm* — Merchant & Gould P.C.

(57) ABSTRACT

In non-limiting examples of the present disclosure, systems and methods for dynamically updating contour maps are provided. A first water level for a body of water may be determined by a computing device. A location within the body of water may be identified. A second water level relating to the identified location within the body of water may be determined, and the second water level and the first water level may be compared. Upon comparing the first and second water levels, a contour map for the body of water may be automatically updated.

13 Claims, 16 Drawing Sheets

(56) References Cited

U.S. PATENT DOCUMENTS

| | | | | |
|---|---|---|---|---|
| 2015/0204645 A1* | 7/2015 | Lauenstein | ....... | G06F 17/30241 |
| | | | | 702/5 |
| 2015/0204975 A1* | 7/2015 | Lauenstein | ....... | G06F 17/30241 |
| | | | | 367/88 |
| 2015/0205007 A1* | 7/2015 | Lauenstein | ....... | G06F 17/30241 |
| | | | | 702/16 |
| 2015/0205895 A1 | 7/2015 | Lauenstein et al. | | |
| 2015/0206327 A1* | 7/2015 | Lauenstein | ....... | G06F 17/30241 |
| | | | | 345/440 |
| 2016/0061951 A1* | 3/2016 | Brown | ................ | G01S 15/8902 |
| | | | | 367/7 |

OTHER PUBLICATIONS

Humminbird, Humminbird® AutoChart™, http://www.humminbird.com/Category/Technology/Autochart/, accessed on Aug. 3, 2015, 14 pages.

\* cited by examiner

UPDATING CONTOUR MAPS FOR BODIES OF WATER

BACKGROUND

Cartographers that practice in the field of underwater mapping have taken advantage of Global Positioning System (GPS) and Sound Navigation and Ranging (SONAR) technologies, as well as those technologies' integration with cloud-based computing environments. Maps and charts depicting bodies of water and their surrounding land masses have become increasingly accurate because of the widespread use and technological advances in those fields. Modern day GPS and SONAR technology provides cartographers with the capability to determine the depth or altitude of a body of water in almost real time to an accuracy of up to or less than a foot. This data is useful to maritime navigators, recreational boaters, and anglers, amongst others.

The depth and altitude data that can be collected and processed by GPS and SONAR computing devices is particularly useful in creating underwater contour maps, which may be utilized by the aforementioned maritime navigators, recreational boaters, and anglers. Maritime navigators and recreational boaters frequently find it useful to consult such maps when determining whether certain sections of a body of water are safe for their vessel to traverse. Anglers may utilize these maps for the same reasons, but are also often times interested in knowing the current depth of a specific location on a body of water, or a future depth for a specific location on a body of water, because fish or other game they are targeting may be known or expected to gather at certain depths and/or at specific underwater structures and locations within that body of water at specific times.

SUMMARY

In general terms, this disclosure is directed to contour mapping. In one possible configuration and by non-limiting example, the disclosure describes a system and method for updating contour maps for bodies of water. Various aspects are described in this disclosure, which include, but are not limited to, the following aspects.

One aspect is a method for dynamically updating contour maps comprising: using at least one processing device: determining a first water level for a body of water; identifying a location within the body of water; determining a second water level relating to the identified location within the body of water; comparing the second water level and the first water level; and automatically updating a contour map for the body of water based on the comparison.

Another aspect is a system comprising: at least one processor; and a memory operatively connected with the at least one processor, the memory comprising computer executable instructions that, when executed by the at least one processor, perform a method comprising: determining a baseline water level for a body of water; identifying a location within the body of water; determining a baseline water level relating to the identified location within the body of water; identifying a current water level relating to the identified location within the body of water; comparing the current water level for the identified location and the baseline water level for the identified location; and automatically updating a contour map for the body of water.

A further aspect is a system for updating contour maps, comprising: a display; a processing device; and a computer-readable storage device storing computer-executable instructions that, when executed by the processing device cause the processing device to display an updated contour map determined by comparing a second water level and a first water level, wherein the first water level is a baseline water level for a body of water determined from a preloaded contour map, and wherein the second water level is a water level determined from one or more received signals from one or more computing devices, the one or more received signals being one of: a GPS altitude signal, a signal originating from an online database that provides periodic updates regarding the body of water's height, and a signal obtained via a cellular data connection.

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

DETAILED DESCRIPTION

Figure 1:
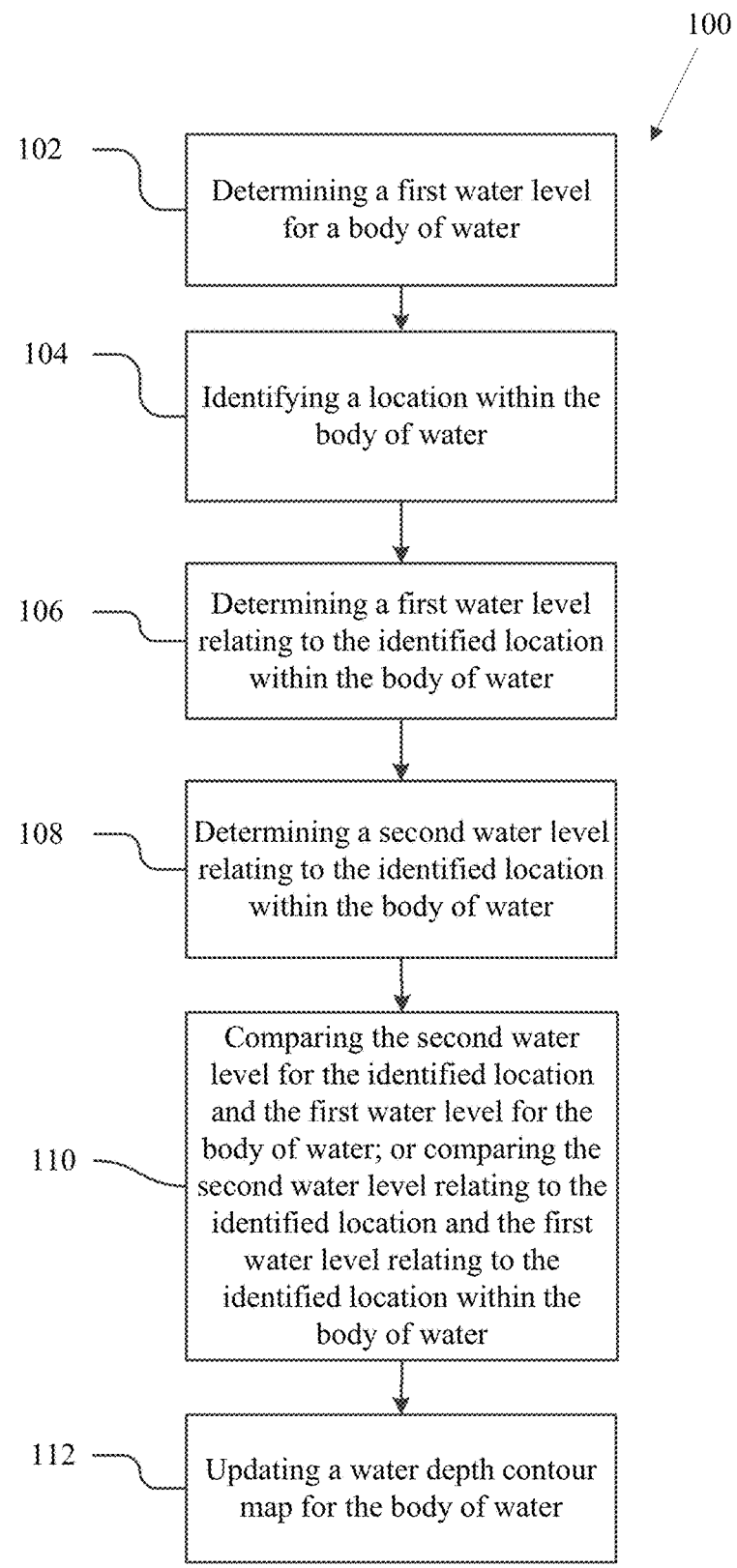
FIG. 1 is an exemplary method for dynamically updating a contour map for a body of water.

Various aspects of the current disclosure will be described in detail with reference to the drawings, wherein like reference numerals represent like parts and assemblies throughout the several views. Reference to various aspects and/or embodiments does not limit the scope of the claims attached hereto. Additionally, any examples set forth in this specification are not intended to be limiting and merely set forth some of the many possible aspects in which the appended claims may be practiced.

Referring to FIG. 1, an illustration of a flowchart representing an exemplary aspect of a method 100 for dynamically updating contour maps for bodies of water is provided. In this example the method 100 includes operations 102, 104, 106, 108, 110 and 112.

Flow begins at operation 102 where a baseline water level for a body of water is determined. According to examples, the baseline water level may be preloaded on a computing device located on a water vessel or obtained from a server or network of servers as more fully described with reference to FIG. 14.

Upon determining a baseline water level for the body of water flow continues to operation 104 where a location within the body of water is identified. The body of water may be any body of water that a user may be interested in traversing, including a river, a lake, a sea or an ocean.

According to examples the location within the body of water may correspond to a current location of a water vessel on the body of water or a location on the body of water that a user is interested in traversing or exploring at a future time.

Flow continues to operation 106 where a first water level relating to the identified location within the body of water is determined. Upon determining the first water level relating to the identified location within the body of water flow continues to operation 108 where a second water level relating to the identified location within the body of water is determined.

Upon determining a second water level relating to the identified location within the body of water flow continues to operation 110 where the second water level for the identified location and the baseline water level for the identified location are compared; or alternatively, the second water level for the identified location and the first water level for the identified location are compared.

From operation 110 the flow continues to operation 112 where a water depth contour map for the body of water is updated.

Figure 2:
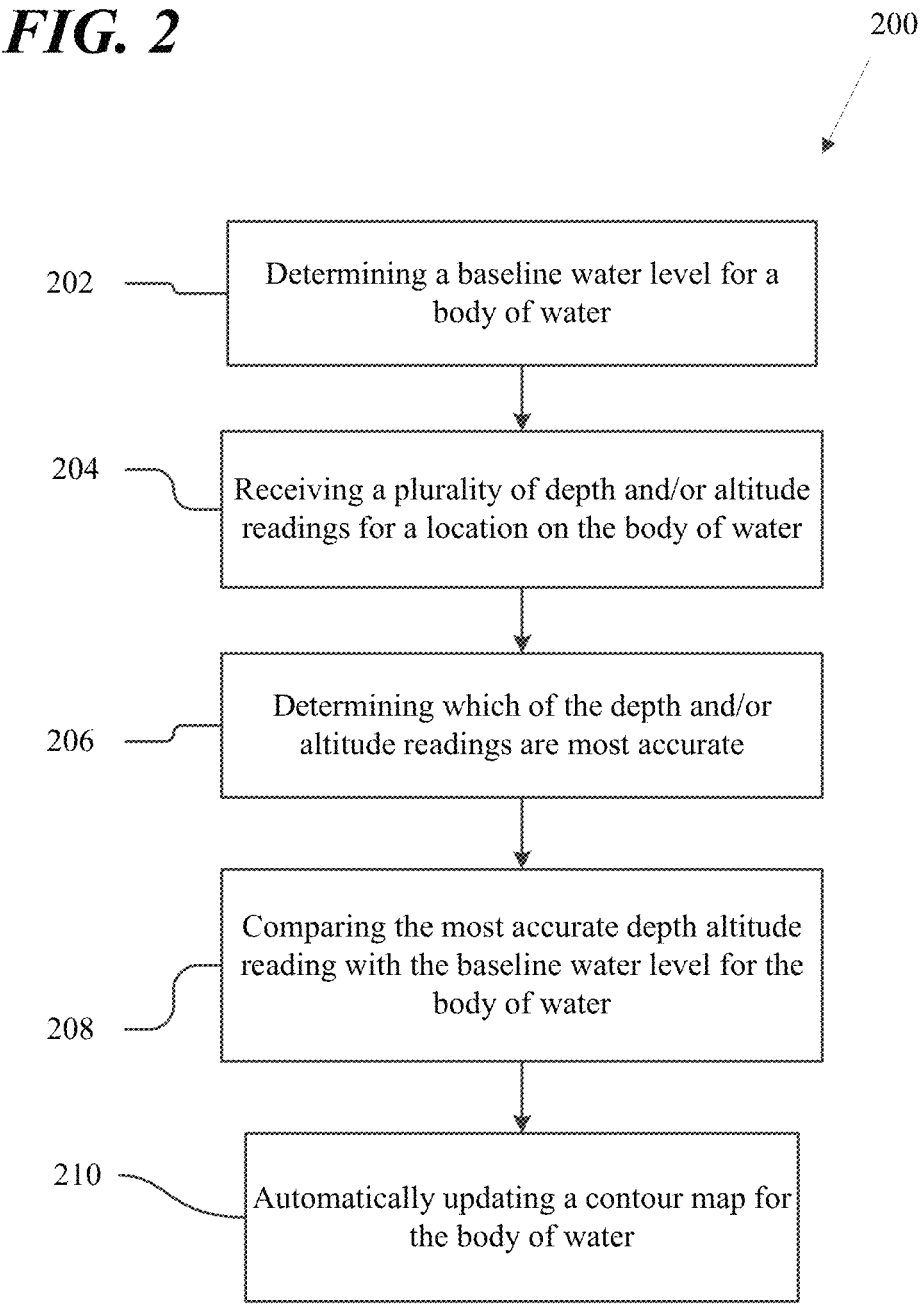
FIG. 2 is another exemplary method for dynamically updating a contour map for a body of water.

FIG. 2 is an exemplary flowchart representing one aspect of method 200 for dynamically updating contour maps for bodies of water. In this example the method 200 includes operations 202, 204, 206, 208 and 210.

Flow begins at operation 202 where a baseline water level for a body of water is determined. According to examples, the baseline water level may be preloaded on a computing device located on a water vessel or obtained from a server or network of servers as more fully described with reference to FIG. 14.

Flow continues to operation 204 where a plurality of depth and/or altitude readings for a location on the body of water are received. According to examples of the disclosure and as more fully described with reference to FIGS. 3, 4 and 5, the depth readings may be obtained from GPS computing devices, SONAR computing devices and/or other data transfer points such as a cell phone tower and related computing devices.

Upon receiving a plurality of depth and/or altitude readings for a location on a body of water flow continues to operation 206. At operation 206 a determination is made as to which of the depth and/or altitude readings are the most accurate with regard to current water levels.

Continuing to operation 208 a comparison is made between the most accurate depth or altitude reading and the baseline water level for the body of water.

From operation 208 flow continues to operation 210 where a contour map for the body of water is automatically updated.

Figure 3:
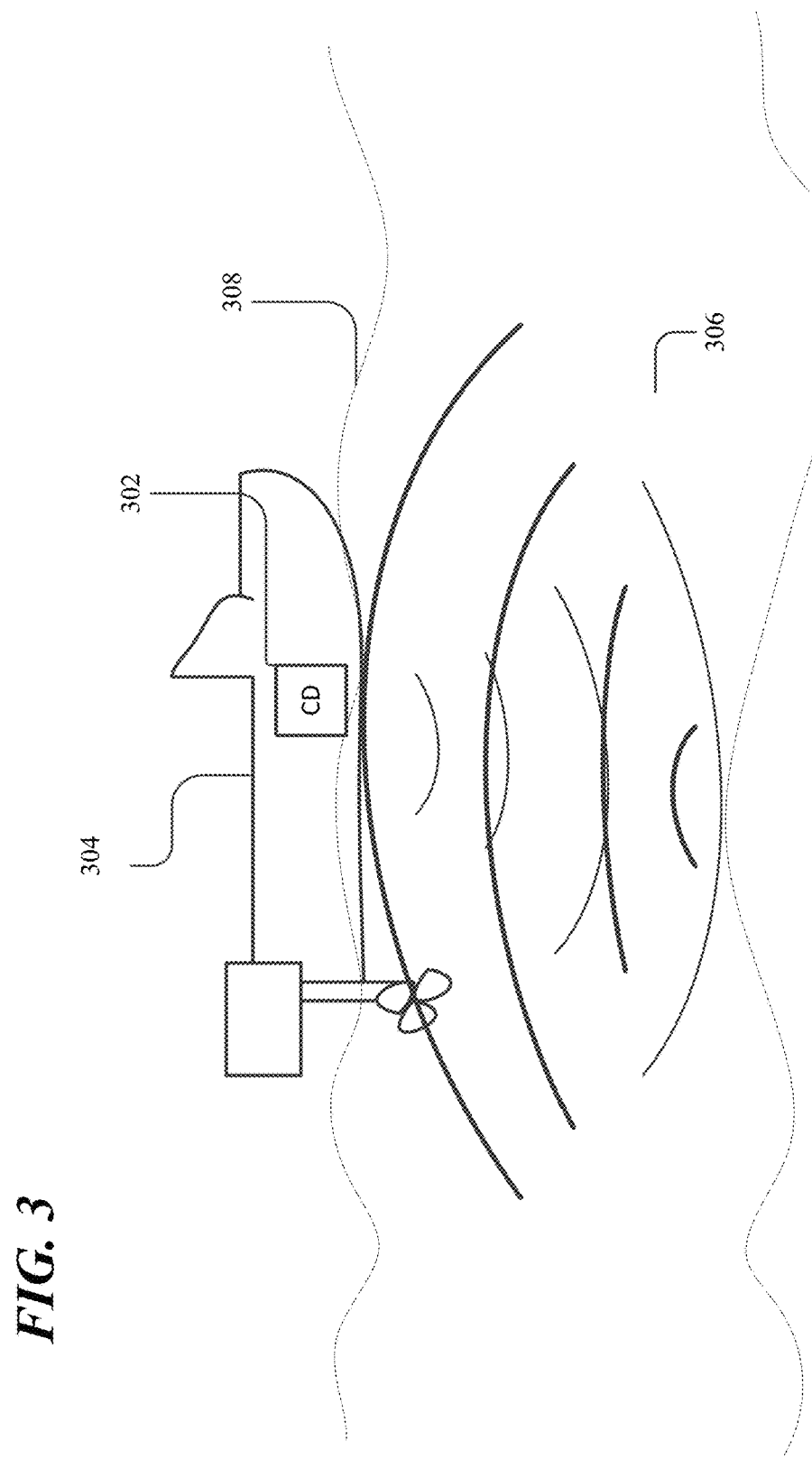
FIG. 3 depicts a mechanism by which depths for a body of water may be determined.

Turning to FIG. 3 mechanisms by which depths for a body of water may be determined according to aspects disclosed herein are provided.

As shown, a computing device 302 is provided on water vessel 304. Computing device 302 may be affixed to or removable from water vessel 304 and may be capable of sending, receiving and analyzing SONAR signals 306 to determine a current depth of body of water 308 at a specific location on the body of water 308.

Computing device 302 may also be integrated with or connected to a computing unit that has preloaded contour maps for one or more bodies of water. Upon determining a current depth of body of water 308 computing device 302 may compare that depth with a preloaded contour map for the body of water 308 vessel 304 is located on and dynamically update the contour map to reflect a more accurate depth for the entirety of the body of water 308 or a specific location on body of water 308.

Figure 4:
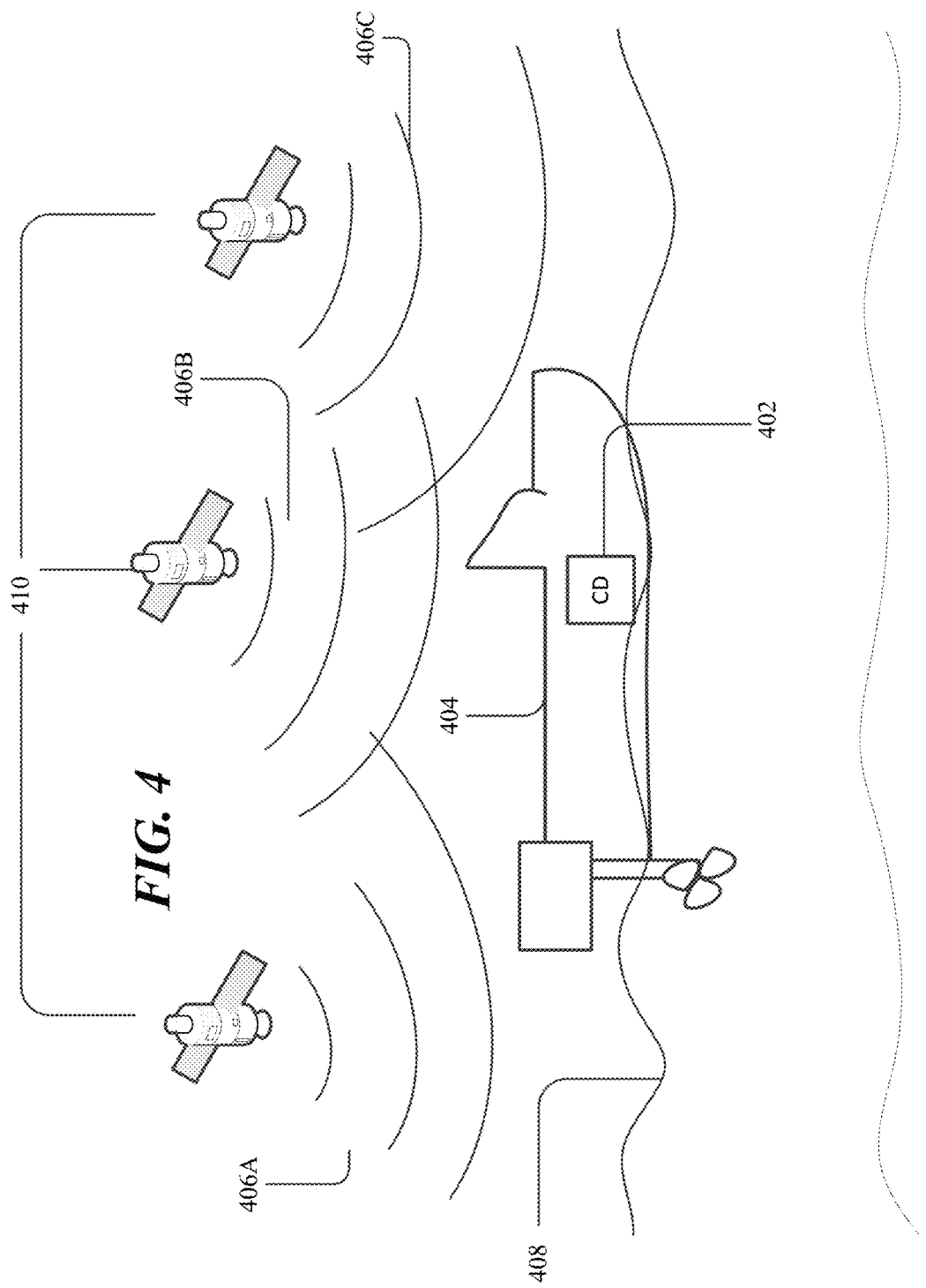
FIG. 4 depicts a mechanism by which altitude readings for a body of water may be determined.

Turning to FIG. 4 mechanisms by which an altitude for a body of water may be determined according to aspects of the current disclosure are provided.

As shown, a computing device 402 is provided on water vessel 404. Computing device 402 may be affixed to or removable from water vessel 404 and may be capable of receiving and analyzing GPS signals 406A, 406B and 406C from a plurality of satellites 410 to determine a current altitude of a body of water 408 at a specific location on the body of water 408.

Computing device 402 may be integrated with or connected to a computing unit that has preloaded contour maps for one or more bodies of water. Upon determining a current depth of a body of water 408 computing device 402 may compare that depth with a preloaded contour map for the body of water 408 vessel 404 is located on and dynamically update the contour map to reflect a more accurate depth for the entirety of the body of water 408 or a specific location on body of water 408.

Figure 5:
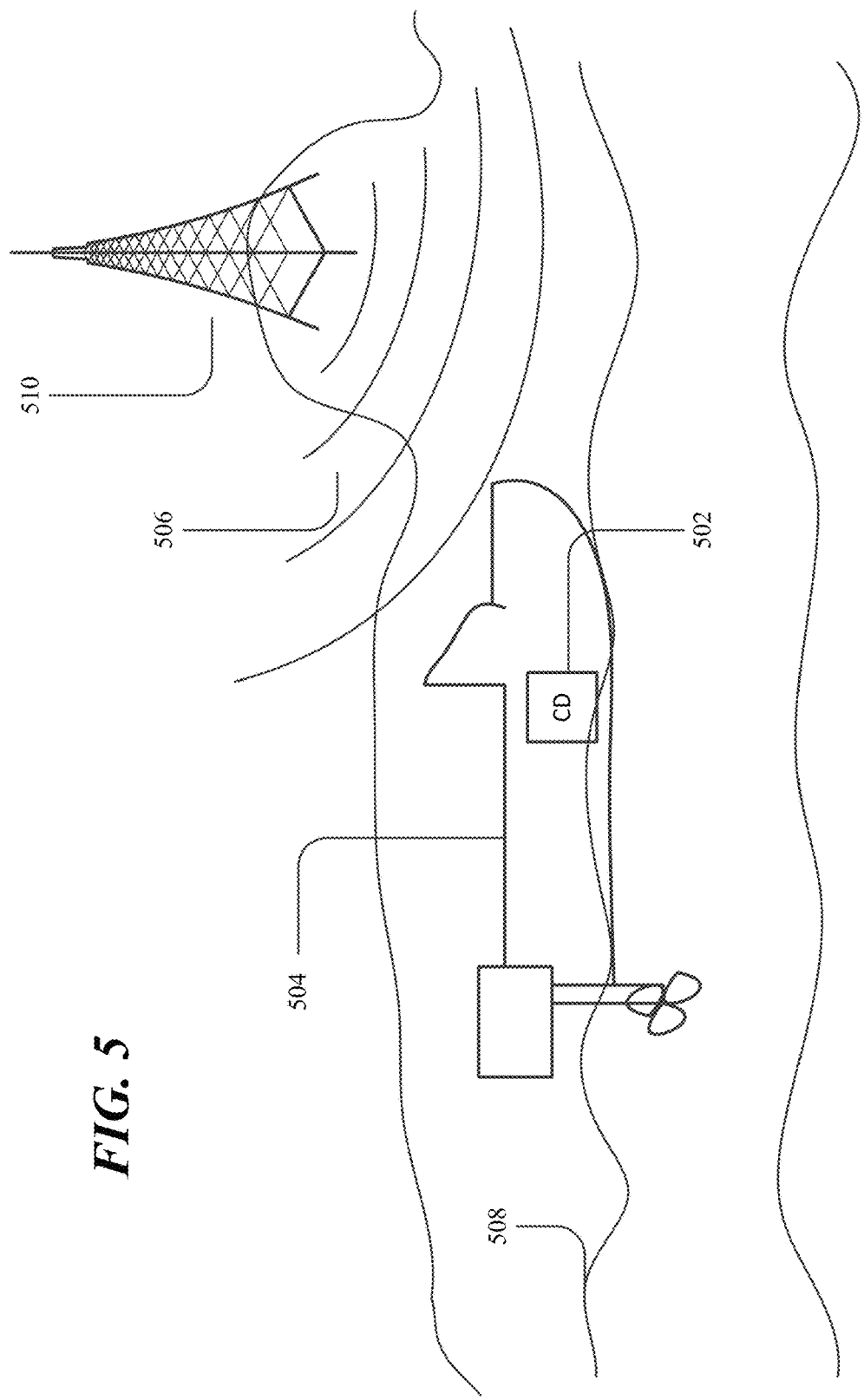
FIG. 5 depicts a mechanism by which water levels at a certain location within a body of water may be determined.
Figure 13:
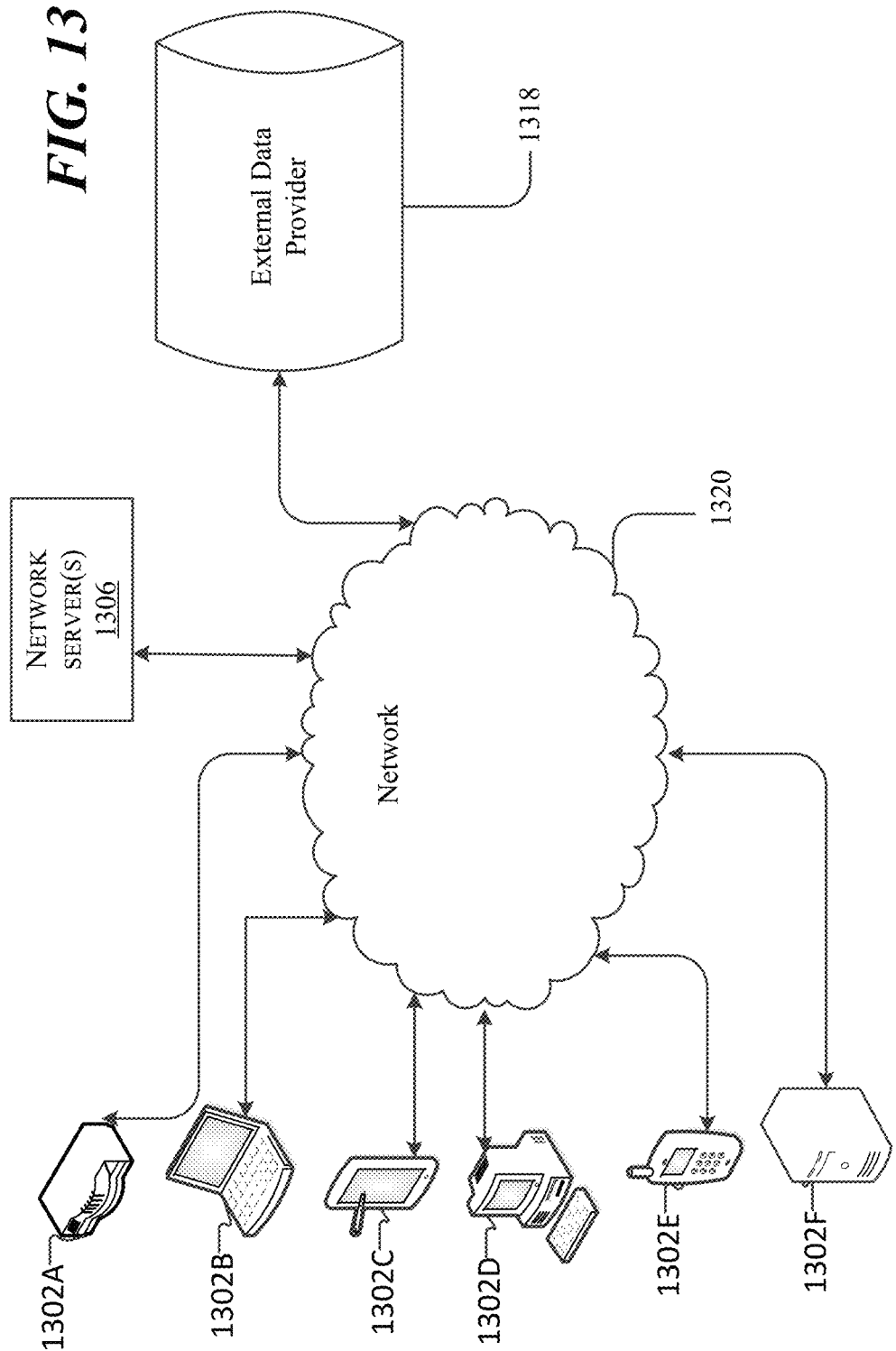
FIG. 13 is an example distributed computing network in which various aspects of the present disclosure may be practiced.
Figure 14:
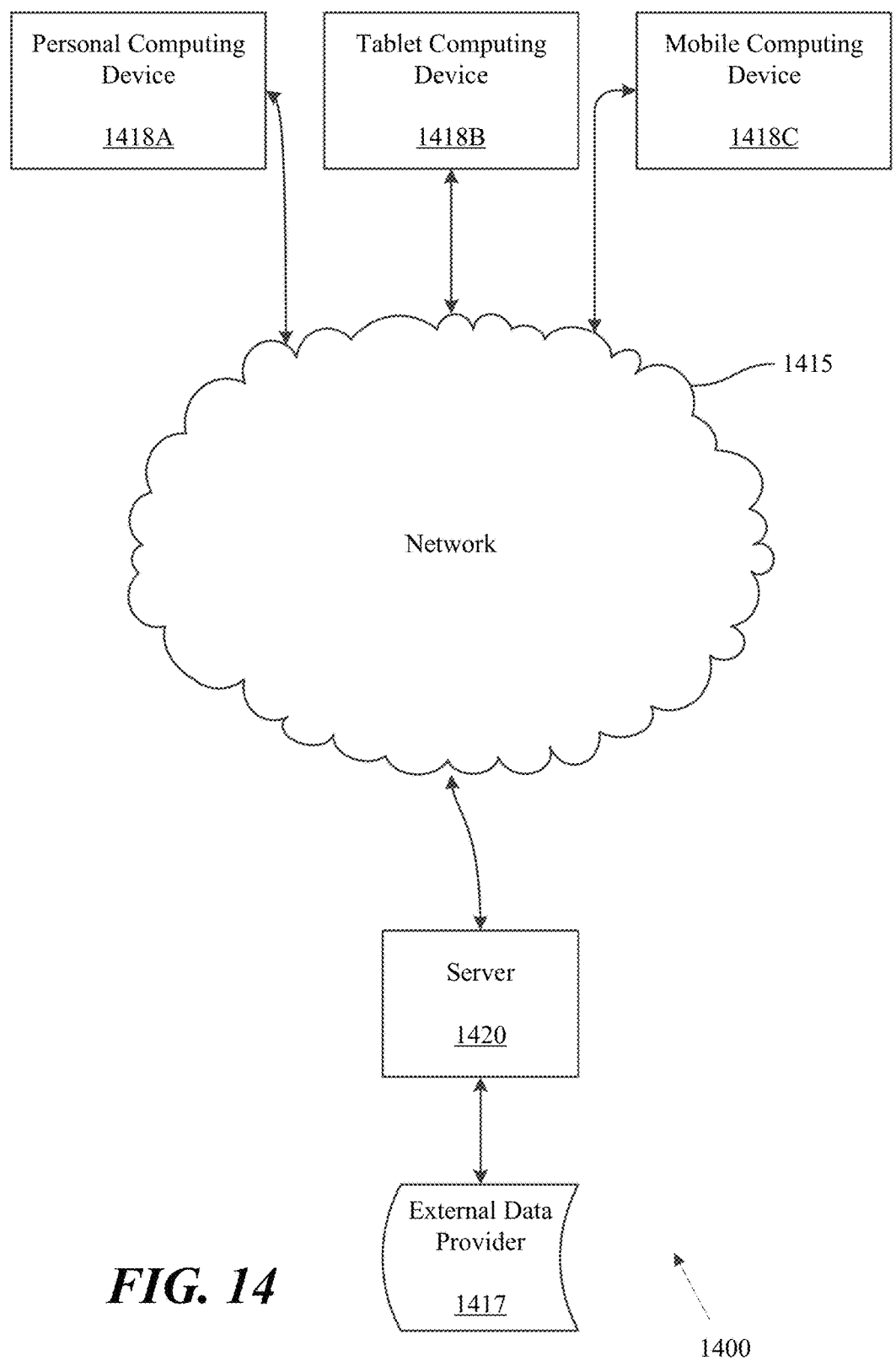
FIG. 14 is a simplified distributed computing network in which various aspects of the present disclosure may be practiced.

FIG. 5 depicts an exemplary environment in which aspects of the current disclosure may be implemented for determining water levels for a body of water at one or more locations. As shown, computing device 502 may be affixed to or removable from water vessel 504 and may be capable of receiving and analyzing data signals 506 from data tower 510 to determine a recent water level for a body of water at one or more locations. According to examples, data received from data tower 510 may be relayed by servers 1420 as depicted in FIG. 14 utilized by an external data provider 1318 as depicted in FIG. 13 and external data provider 1417 depicted in FIG. 14 that stores or streams data from a website that collects periodic data from transponders located on or adjacent to bodies of water such as body of water 508.

Computing device 502 may be integrated with or connected to a computing unit that has preloaded contour maps for one or more bodies of water. Upon determining a recent depth for body of water 508 by analyzing data signals 506 received from data tower 510 corresponding to an external data provider 1318 as depicted in FIG. 13 and external data provider 1417 depicted in FIG. 14 which contains water level data points that are periodically updated, recorded, stored and sent to one or more external data providers such as external data provider 1318 and external data provider 1417, computing device 502 may compare one or more of the recently recorded depths for a body of water with a preloaded contour map for the body of water 508 vessel 504 is located on and dynamically update the contour map to reflect a more accurate depth for the entirety of the body of water 508 or a specific location on body of water 508.

Figure 6:
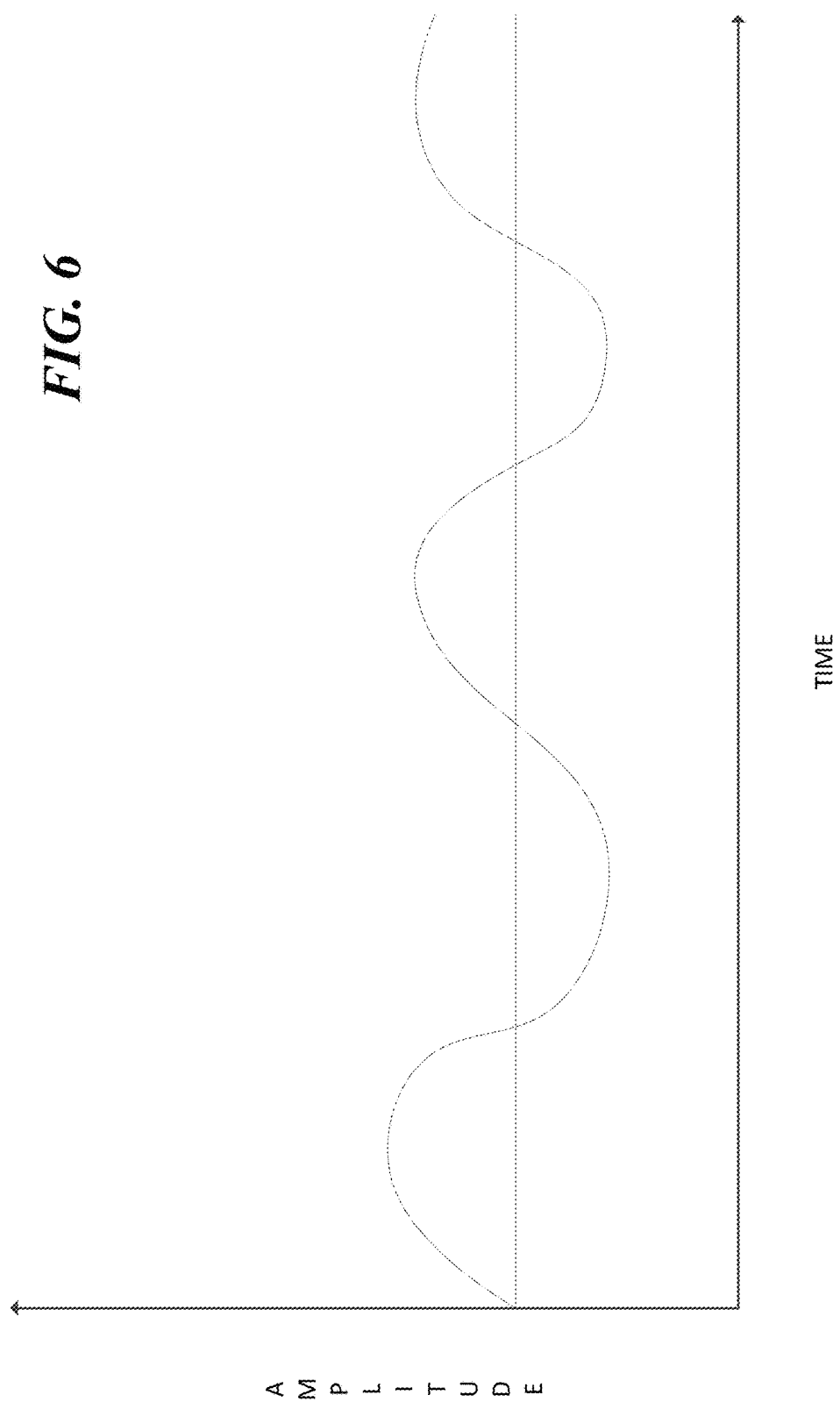
FIG. 6 is a graph depicting averaging of water levels for a body of water.

Turning to FIG. 6 a graph depicting averaging of water levels for a body of water is shown. Averaging water levels may be incorporated in the examples described herein because water levels within a body of water are generally fluctuating due to waves or other disturbances in the body of water. For example, if a storm or other disturbance is in the vicinity of a body of water waves may be generated in the body of water that would affect a depth reading for the body of water at specific locations within the body of water. The X axis depicts time and the Y axis depicts the amplitude for wave heights in feet, but other International System of Units (SI) or metric units may be utilized to determine an average water height for a period of time. It will be well understood by those of skill in the art that various other mathematical models may be utilized for determining a rolling or moving average to account for wave fluctuations in a body of water.

Figure 7:
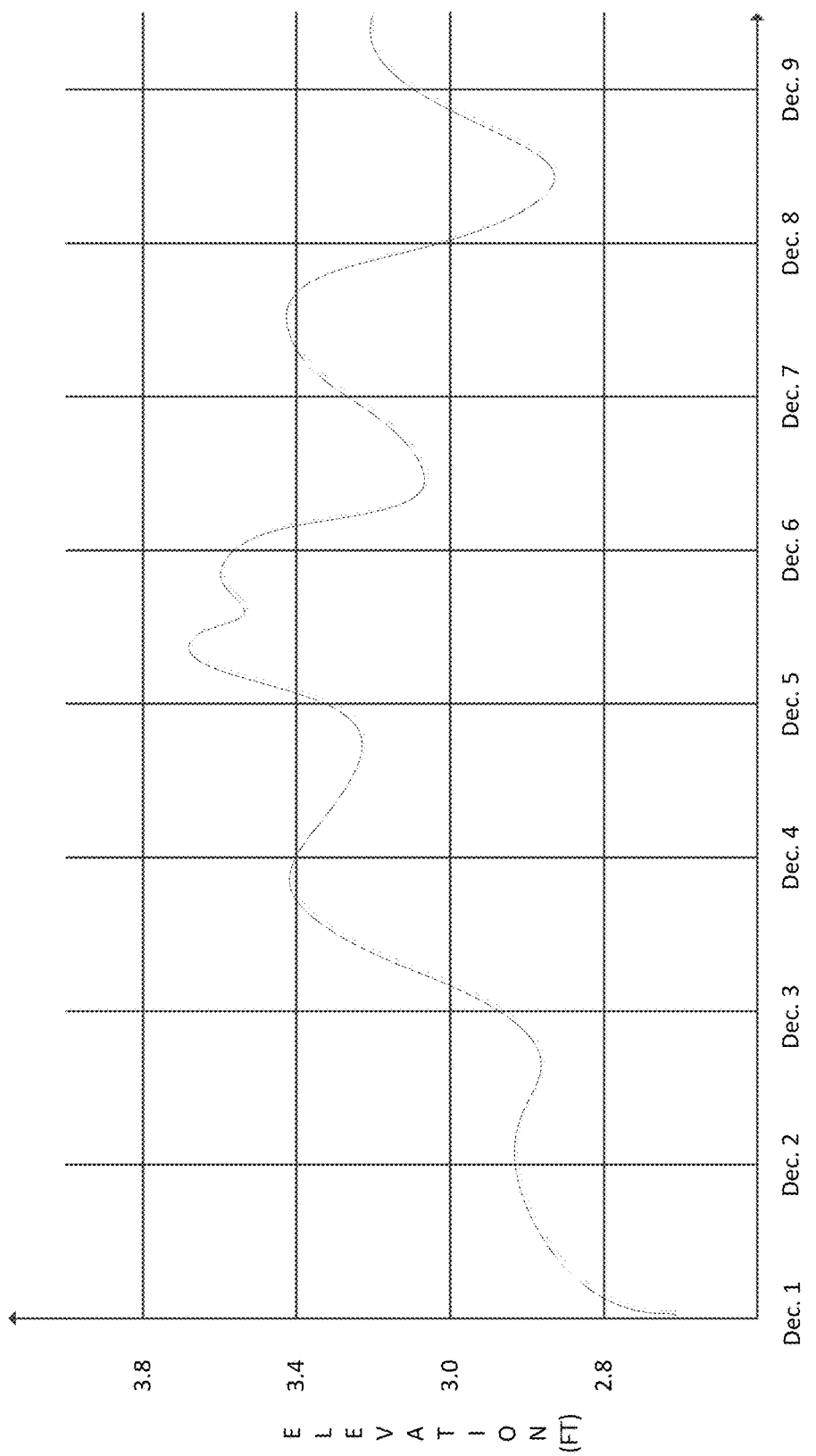
FIG. 7 is a graph depicting determined water levels at a location on a body of water.

At FIG. 7 a graph depicting determined water levels at a location on a body of water is shown. With reference to FIG. 5, computing device 502 may be affixed to or removable from water vessel 504 and may be capable of receiving and analyzing data signals 506 from data tower 510 to determine a recent water level for a body of water at one or more locations. According to examples, data received from data tower 510 may be relayed by servers 1306 as depicted in FIG. 13 utilized by an external data provider 1318 that stores or streams data from a website that collects periodic data from transponders located on or adjacent to bodies of water such as body of water 508, as more fully described infra with respect to FIG. 7.

One example is a website maintained by the US Army Corps of Engineers, found at http://www.nwd-mr.usace.army.mil/rcc/plots/plots.html, which contains data for bodies of water within the Missouri River Basin Rivers and Reservoirs which is graphically displayed and reflects hourly data points reflecting water levels for various bodies of water for the Missouri River Basin Rivers and Reservoirs and its major tributaries. Such a website and its corresponding data points may be accessed by way of a computing device such as computing devices 1302A, 1302B, 1302C, 1302D, 1302E and 1302F depicted in FIG. 13. Such a website may stream or transmit stored water level data to a computing device 1302A, 1302B, 1302C, 1302D, 1302E and 1302F via an external data provider 1318 through a network 1320, including water level data that has been obtained by a water level determination point affixed to a fixed point in a body of water such as a dam or such data may be generated from a computing device located on the body of water that periodically takes readings of depth and or altitude water levels such as a buoy with access to GPS, SONAR and/or other data connections such as a cell phone tower.

Figure 8:
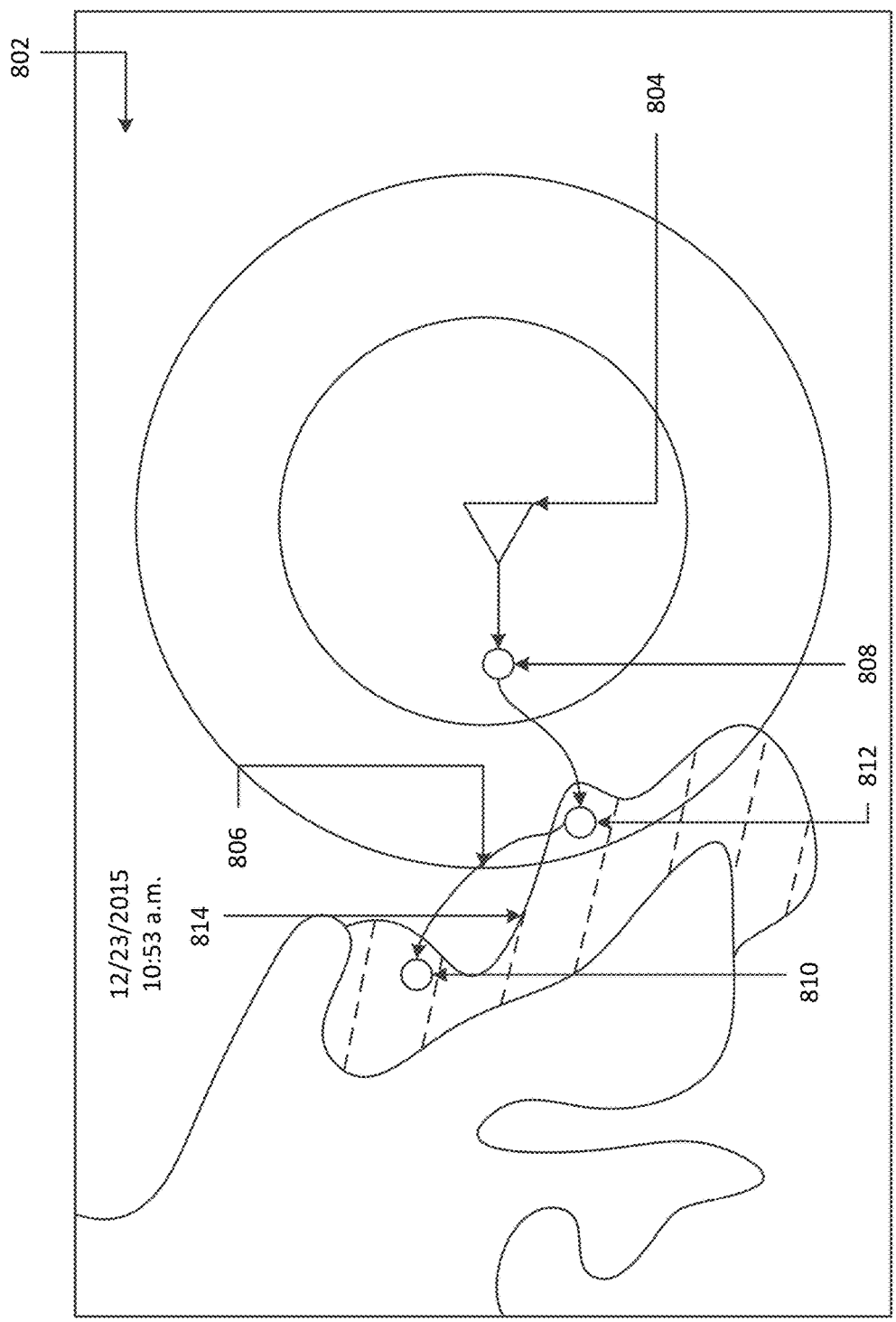
FIG. 8 depicts an exemplary graphical user interface for alerting a user that locations on a body of water may be unsafe to navigate for a water vessel.

Turning to FIG. 8 an exemplary graphical user interface 802 for alerting a user that locations on a body of water may be unsafe to navigate for a water vessel 804 is depicted. According to examples a user may input into computing device 1510 shown in FIG. 15 or computing device 1600 shown in FIG. 16 a route 806 the user would like to traverse on a body of water. Accordingly, if a route has been programmed from a first point 808 to a second point 810 and it is projected that it would take three days to traverse that distance at the vessel's current rate of speed, various points along the route including points 808, 810, 812 may be calculated and checked to ensure that there is enough depth for the vessel 804 to safely traverse the route 806. A user may also set an "alert" depth for routes, whereby any projected depths less than the input "alert" depth would enable an alert for the user that the route may be unsafe to traverse. For example, the graphical user interface may display an alert area 814 which may comprise gridlines for the unsafe alert area 814 or a shaded or colored alert area 814 corresponding to potentially unsafe depths for vessel 804 to traverse the route at points 812 and 810. It will be well understood by those of skill in the art that various other mechanisms and displays may be provided to alert a user that an area is unsafe to navigate because the area is projected to be unsafe at the projected time of traversal.

Figure 9:
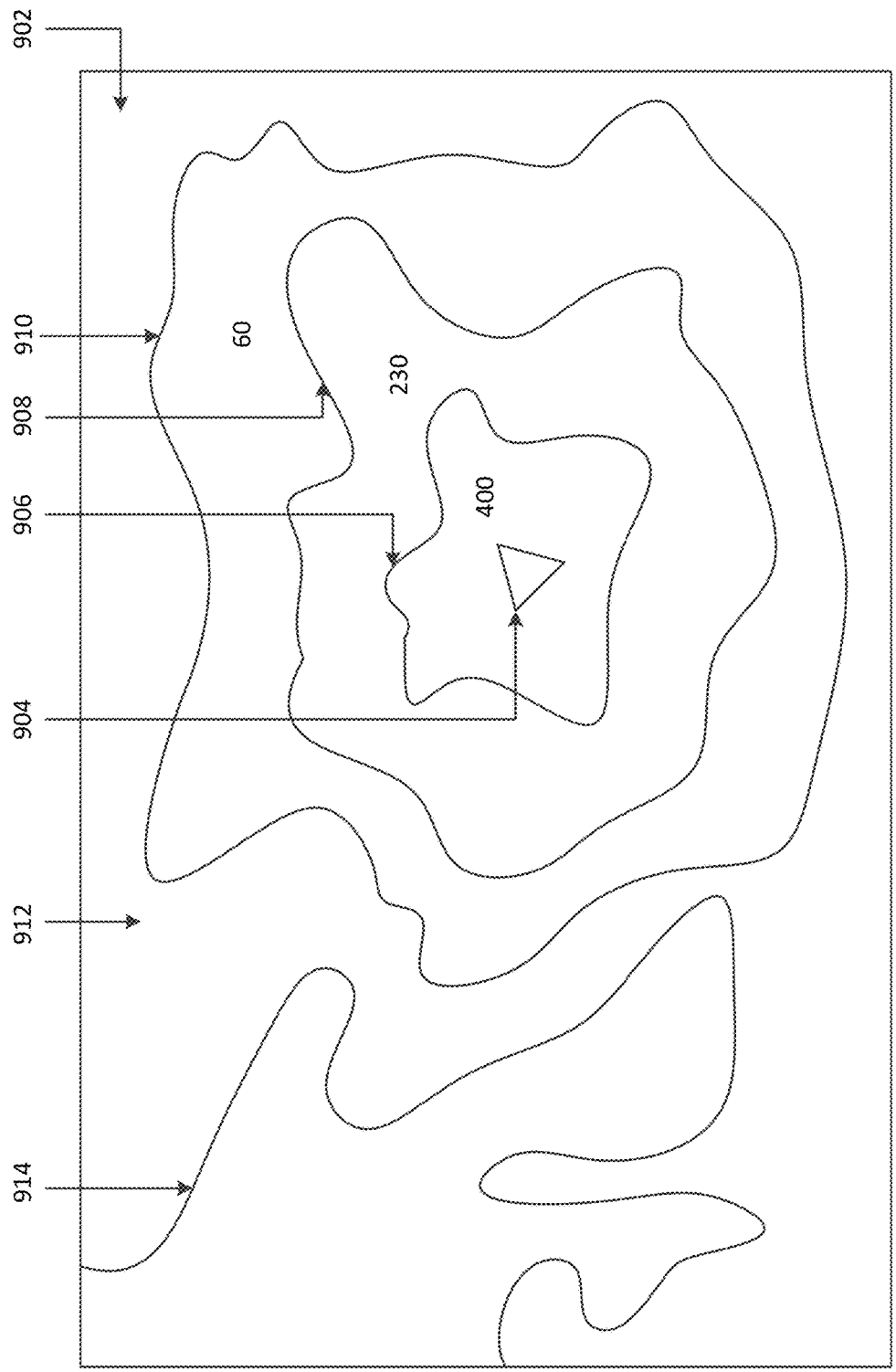
FIG. 9 is an exemplary graphical user interface for displaying a contour map.

Turning to FIG. 9 an exemplary graphical user interface 902 depicting a water contour map is depicted. Water vessel 904 is shown with surrounding body of water 912 having contour lines 906, 908 and 910, and above water terrain 914. Graphical user interface 902 shows various depths for various topographies surrounding water vessel 904 as represented by contour lines 906, 908 and 910 within the displayed portion of the contour map. The graphical user interface 902 may zoom in or out to display more or less of the body of water 912 and its surrounding areas.

Figure 10:
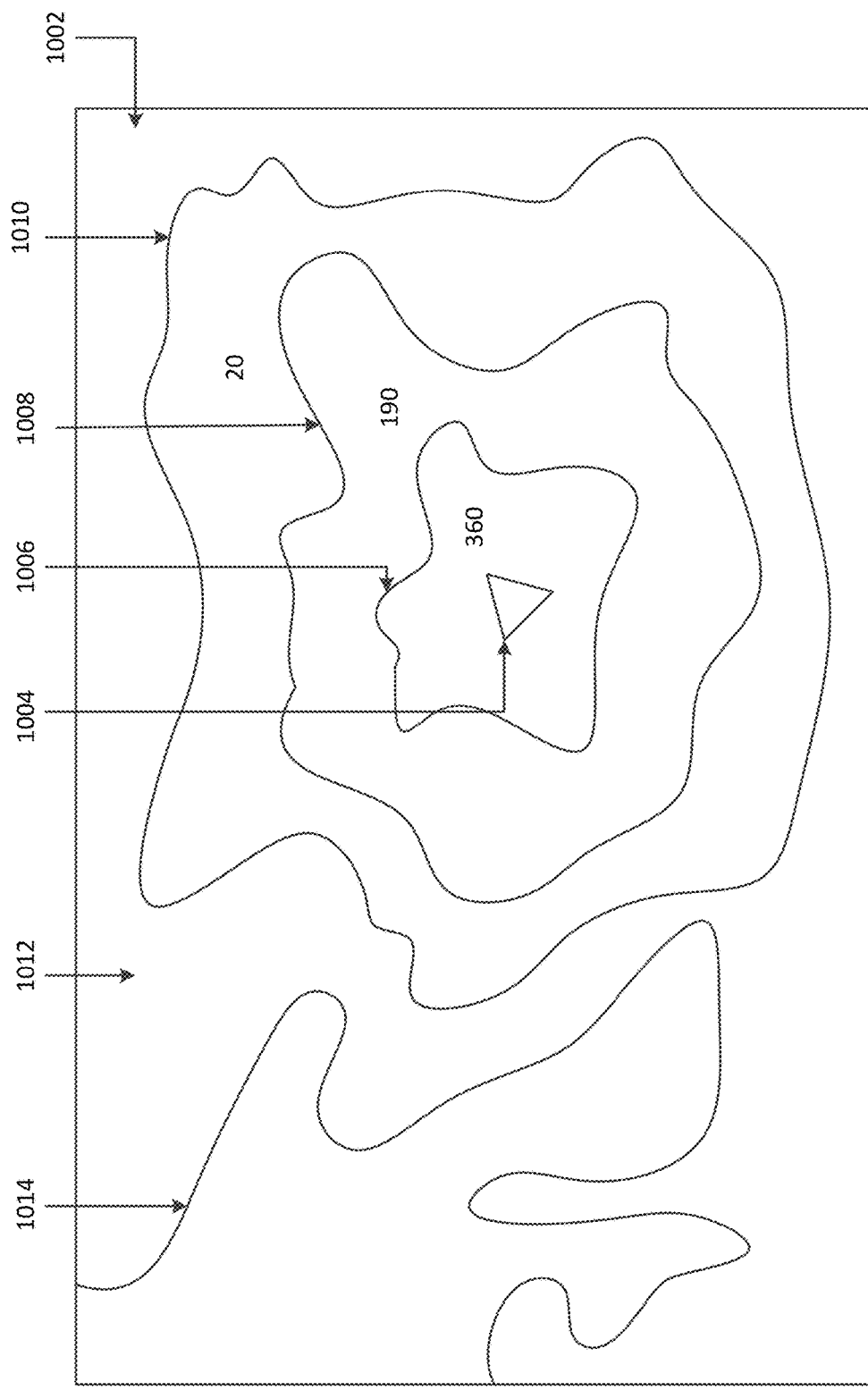
FIG. 10 is an exemplary graphical user interface for displaying an updated contour map.

At FIG. 10 an exemplary graphical user interface for displaying an updated contour map is depicted. Water vessel 1004 is shown with surrounding body of water 1012 having contour lines 1006, 1008 and 1010, and above water terrain 1014. In this example graphical user interface 902 from FIG. 9 has been updated according to one of methods 100 and 200 to display a current or projected depth from the body of water 1012 which has been updated as shown with regard to body of water 1012 in FIG. 10. As shown, contour lines 906, 908 and 910 within body of water 912 as depicted and displayed in graphical user interface 902 from FIG. 9 have been updated from depths of 400, 230 and 60 (in measurement units such as feet or meters) with regard to the graphical user interface 1002 where contour lines within body of water 1012 have been updated from their previous depths shown in FIG. 9. For example, contour line 1006 has an updated depth of 360, contour line 1008 has an updated depth 190, and contour line 1010 has an updated depth of 20 (in measurement units such as feet or meters).

Figure 11:
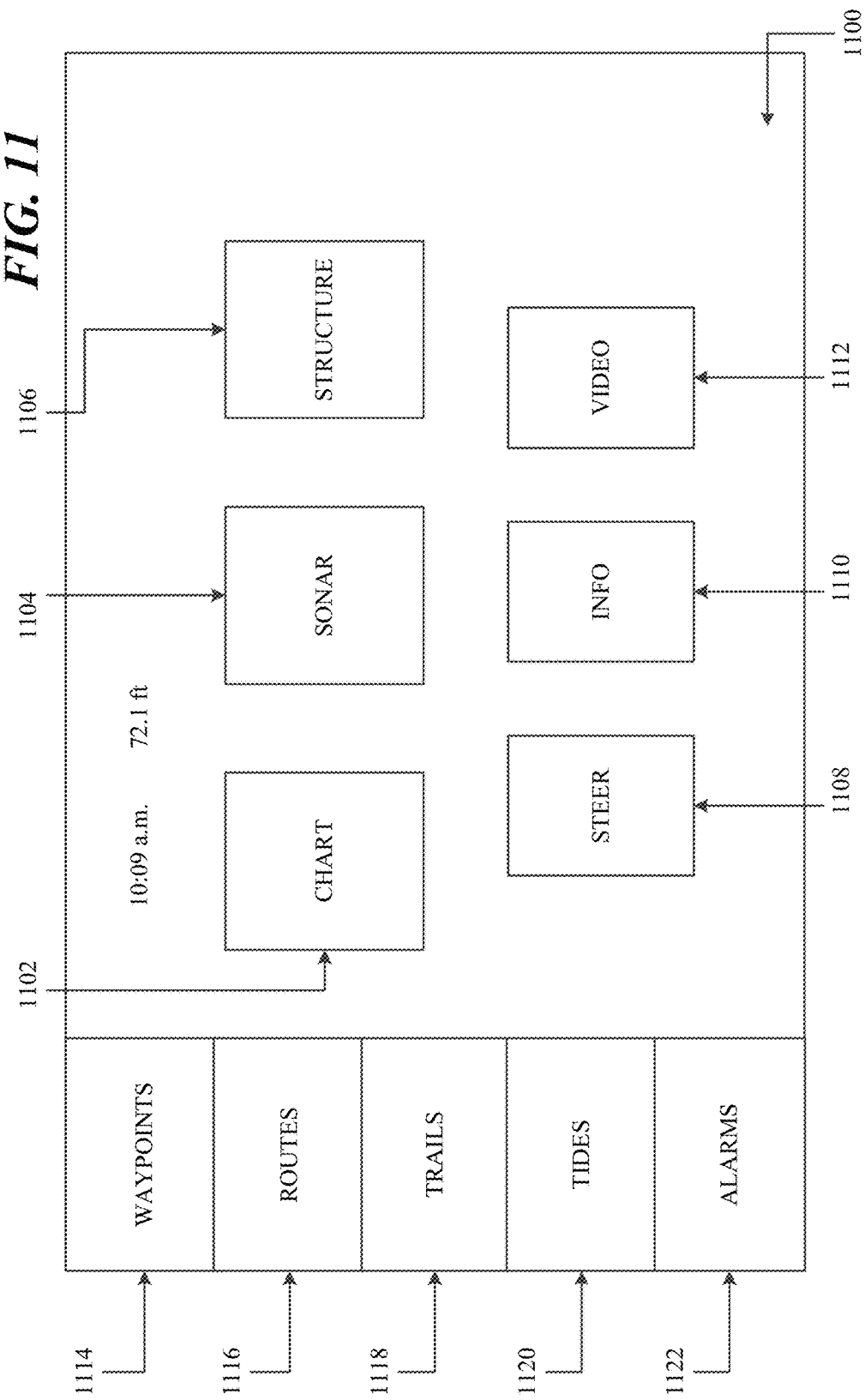
FIG. 11 is an exemplary graphical user interface for a computing device with which aspects of the current disclosure may be practiced.

Turning to FIG. 11 an exemplary graphical user interface for a computing device with which aspects of the current disclosure may be practiced is depicted. According to aspects a user may access display 1100 by utilizing a settings menu accessed through the graphical user interface. Once display 1100 is accessed various additional settings may be accessed including CHART setting 1102 SONAR setting 1104 STRUCTURE setting 1106 STEER setting 1108 INFO setting 1110 and VIDEO setting 1112.

Figure 12:
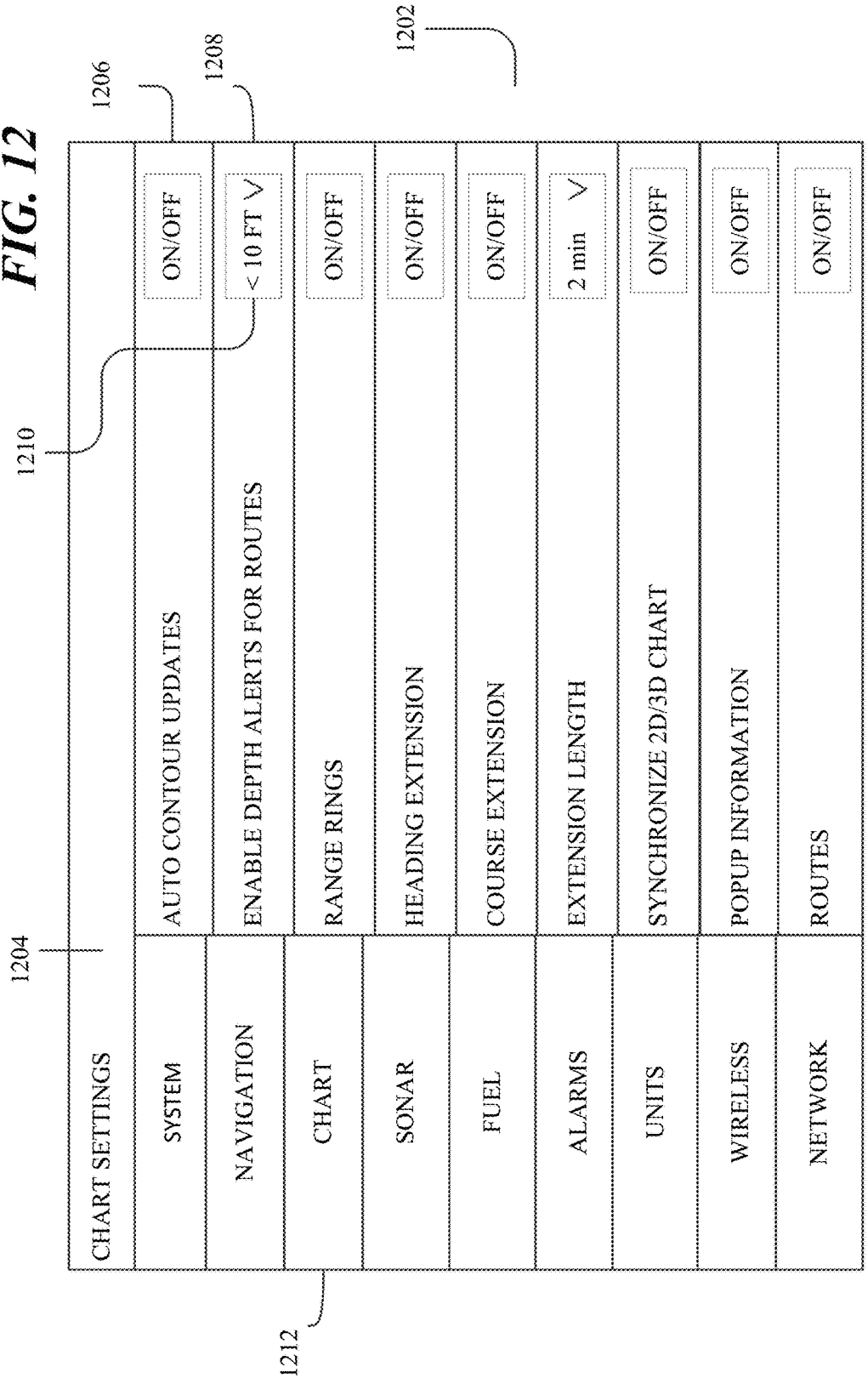
FIG. 12 is an exemplary graphical user interface for a computing device with which aspects of the current disclosure may be practiced.

According to one example a user may access the CHART setting 1102 whereby the user may control settings related to dynamic updates to a water contour map as further described in relation to FIG. 12. According to additional examples CHART setting 1102 may show an overall contour map of where a vessel is located and may also contain selectable overlays such as a current date, time, speed, depth, water temperature, icon for the vessel, and the like.

According to yet another example a user may access the SONAR setting 1104 whereby the user may obtain data and graphical representations of information related to the depth of a body of water via display 1100. According to certain aspects a user may select a depth range to display. For example, if the user is fishing at a position in a body of water at a location that is twenty feet in depth, the user may select the display 1100 via the SONAR setting 1104 to only show depths of between ten and twenty feet. Additionally, the SONAR setting 1104 may be utilized to increase or decrease SONAR sensitivity with relation to objects that would be displayed within chosen depths utilizing the SONAR setting 1104 via display 1100.

According to an additional example the SONAR setting 1104 may be further configured to provide a high definition StructureScan via display STRUCTURE setting 1106. Accordingly, the StructureScan may be configured as a panel on display 1100 to be set up as a DownScan image, displaying left and right SONAR scanning and/or the DownScan image may be added as an overlay to a traditional SONAR image via display 1100. In additional examples the STEER setting 1108 may be utilized to provide autopilot settings for a trolling motor. For example, the STEER setting 1108 may set a heading to maintain, navigate a vessel to a user selected point, waypoint, or a location along a route. According to additional examples the STEER setting 1108 may be utilized to select a speed which a vessel will traverse via autopilot and it may also be accessed to select a depth range which the vessel may traverse.

According to one example a user may access INFO setting 1110 and create or modify custom displays for display 1100. For example, a user may access INFO setting 1110 and modify display 1100 to display a 50/50 split with various display screens such as one half of display 1100 showing the SONAR 1104 interface and one of half of display 1100 showing CHART 1102. According to additional examples a user may modify display 1100 utilizing INFO setting 1110 to depict various representations and arrangements of gauges such as, by way of example, gauges for time, depth, water temperature, position, and speed, amongst other non-limiting aspects that will be well understood by those of skill in the art.

According to another example the VIDEO setting 1112 may display a live underwater video feed to display 1100 using a camera affixed to a vessel that provides the display 1100 with streaming videos at fixed or user selected depths.

According to examples a user may access WAYPOINTS 1114 to display saved or frequently traveled locations such as one or more boat ramps or prized fishing spots. WAYPOINTS 1114 may also be accessed to mark one or more areas of importance, such as areas that are potentially dangerous (e.g., shallow water), or a vessel's current location.

According to additional examples a user may access ROUTES 1116 to provide assistance with navigation. According to one aspect ROUTES 1116 may provide straight line navigation (e.g., direct navigation from point A to point B), and such assisted navigation may be calculated, by way of non-limiting examples, from a vessel's current position to a waypoint or any selected destination point. Additionally, ROUTES 1116 may be utilized to traverse recorded routes from one or more primary locations to one or more secondary locations.

According to another example a user may access TRAILS 1118 to provide highlighted paths that a vessel has previously traversed. According to aspects, these paths may be cleared, temporarily cleared, or the paths may be configured to expire after an allotted period of time. For example, if a vessel has previously traversed a path, that previously traversed path may stay on the display 1100 for the next power cycle, letting the user know where they have previously been. TRAILS 1118 may be particularly useful when navigating at night because a user may utilize this function to follow a previously known safe path home.

In an additional example a user may access TIDES 1120 which may contain information relating to current and/or future tides from a tide station. According to aspects TIDES 1120 may provide data from a tide station that is the closest tide station to a user's vessel.

According to yet another example a user may access ALARMS 1122 which may be configured to display alarm settings via the display 1100. According to certain aspects such alarm settings accessed via ALARMS 1122 may contain settings which allow a user to configure depth alarms, which may also be configured to alert a user if their vessel is in danger of traversing a path that is outside of the range of the configured depth alarm. According to additional aspects ALARMS 1122 may allow a user to set a volume associated with an alert, a style of alarm (e.g., pop up, highlighting an unsafe area, etc.). ALARMS 1122 may also be configured to show an alarm history.

Turning to FIG. 12 an exemplary graphical user interface for a computing device with which aspects of the current disclosure may be practiced is depicted. According to aspects disclosed herein a user may enter the chart settings display 1204 shown in graphical user interface 1202 by accessing a settings feature. Upon accessing the chart settings the user may be presented with various features and capabilities accessible through the chart settings display 1204 such as AUTO COUNTOUR UPDATES 1206 and ENABLE DEPTH ALERTS FOR ROUTES 1208. According to such aspects the user may be able to turn any of the features and capabilities on or off through the graphical user interface 1202. A user may also select a depth via depth selection feature 1210 that is enabled to display potentially unsafe depths for a vessel to traverse within a predefined area of a body of water to traverse based on selected depths via the chart settings display 1204.

According to one aspect, a user may select CHART setting 1212 which may provide an additional list of options and/or settings such as Range Rings which may draw a ring around a user's vessel for scale and give a user a general idea of the scale that display 1100 is zoomed in at; Heading Extension which may project a line (which may be configurable for additional features such as color and length) on display 1100 ahead of the vessel and show the vessel's current heading; Course Extension which may provide a Course Over Ground (COG) extension line based on received data from GPS data received by a computing device such as computing device 402 depicted in FIG. 4, as well as be configured to be optionally turned on and off and which may also be configurable for additional features such as color and length; Extension Length which may set how many minutes ahead to set a vessel's extension line (e.g., if a vessel is moving at a speed of 60 miles per hour [1 mile per minute], an extension line of 2 minutes may be configured to show an extension of 2 miles ahead of the vessel; Synchronize Charts which may be utilized to synchronize charts when the display 1100 depicts two or more charts side by side; PopUp Info, which may allow a user to configure information to popup on display 1100 when one or more buttons are pressed or otherwise accessed (e.g., popups may be set to be displayed if those popup settings are enabled); and Routes which may be turned on or off and allow a user to view previous routes, create new routes, and start a navigation of a route.

FIG. 13 is an example diagram of a distributed computing system in which aspects of the present invention may be practiced. According to examples, any of computing devices 1302A (a modem), 1302B (a laptop computer), 1302C (a tablet), 1302D (a personal computer), 1302E (a smart phone), and 1302F (a server) may contain modules, components, engines, etc. for dynamically updating a contour map and projected tide levels for bodies of water. Additionally, according to aspects discussed herein, any of computing devices 1302A-F may contain necessary hardware for implementing aspects of the disclosure such as described below with regard to FIGS. 15 and 16 for performing dynamic updates on a contour map. Any and all of these functions may be performed, by way of example, at network servers 1306 and/or server 1302F when computing devices 1302A-F request or receive data from external data provider 1318 by way of network 1320.

Turning to FIG. 14, one embodiment of the architecture of a system for updating contour maps, predicting tidal levels, providing alerts regarding potentially dangerous vessel traversal locations and executing the methods described herein to one or more client devices is provided. Content and/or data interacted with, requested, or edited in association with one or computing devices may be stored in different communication channels or other storage types. For example, data may be stored using a directory service, a web portal, a mailbox service, an instant messaging store, or a compiled networking service for managing preloaded and/or updated contour maps for one or more bodies of water. The system for updating contour maps, predicting tidal levels, providing alerts regarding potentially dangerous vessel traversal locations and executing the methods described herein may use any of these types of systems or the like for enabling data utilization, as described herein. A computing device 1418A, 1418B, and/or 1418C may provide a request to a cloud/network, which is then processed by a server 1420 in communication with an external data provider 1417. As one example, the server 1420 may provide a data stream in response to a processed request for data related to water levels for an entire body of water or specific locations within a body of water over the web to the computing device 1418A, 1418B, and/or 1418C through a network 1415. By way of example, a client computing device may be implemented as any of the systems described herein, and embodied in a personal computing device 1418A, a tablet computing device 1418B, and/or a mobile computing device 1418C (e.g., a smart phone). Any of these aspects of the systems described herein may obtain content from the external data provider 1417.

In various embodiments, the types of networks used for communication between the computing devices that makeup the present invention include, but are not limited to, an Internet, an intranet, wide area networks (WAN), local area networks (LAN), virtual private networks (VPN), GPS devices, SONAR devices, cellular networks, and additional satellite based data providers such as the Iridium satellite constellation which provides voice and data coverage to satellite phones, pagers and integrated transceivers, etc. According to aspects of the present disclosure, the networks may include an enterprise network and a network through which a client computing device may access an enterprise network. According to additional aspects, a client network is a separate network accessing an enterprise network through externally available entry points, such as a gateway, a remote access protocol, or a public or private Internet address.

Additionally, the logical operations may be implemented as algorithms in software, firmware, analog/digital circuitry, and/or any combination thereof, without deviating from the scope of the present disclosure. The software, firmware, or similar sequence of computer instructions may be encoded and stored upon a computer readable storage medium. The software, firmware, or similar sequence of computer instructions may also be encoded within a carrier-wave signal for transmission between computing devices.

Operating environment 1400 typically includes at least some form of computer readable media. Computer readable media can be any available media that can be accessed by a processor such as processing device 1580 depicted in FIG. 15 and processor 1602 shown in FIG. 16 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 1400 may be a single computer operating in a networked environment using logical connections to one or more remote computers. The remote computer may be a personal computer, a GPS device, a SONAR device such as a fish finder, a server, a router, a network PC, a peer device or other common network node, and typically includes many or all of the elements described above as well as others not so mentioned. The logical connections may include any method supported by available communications media. Such networking environments are commonplace in enterprise-wide computer networks, intranets and the Internet.

Figure 15:
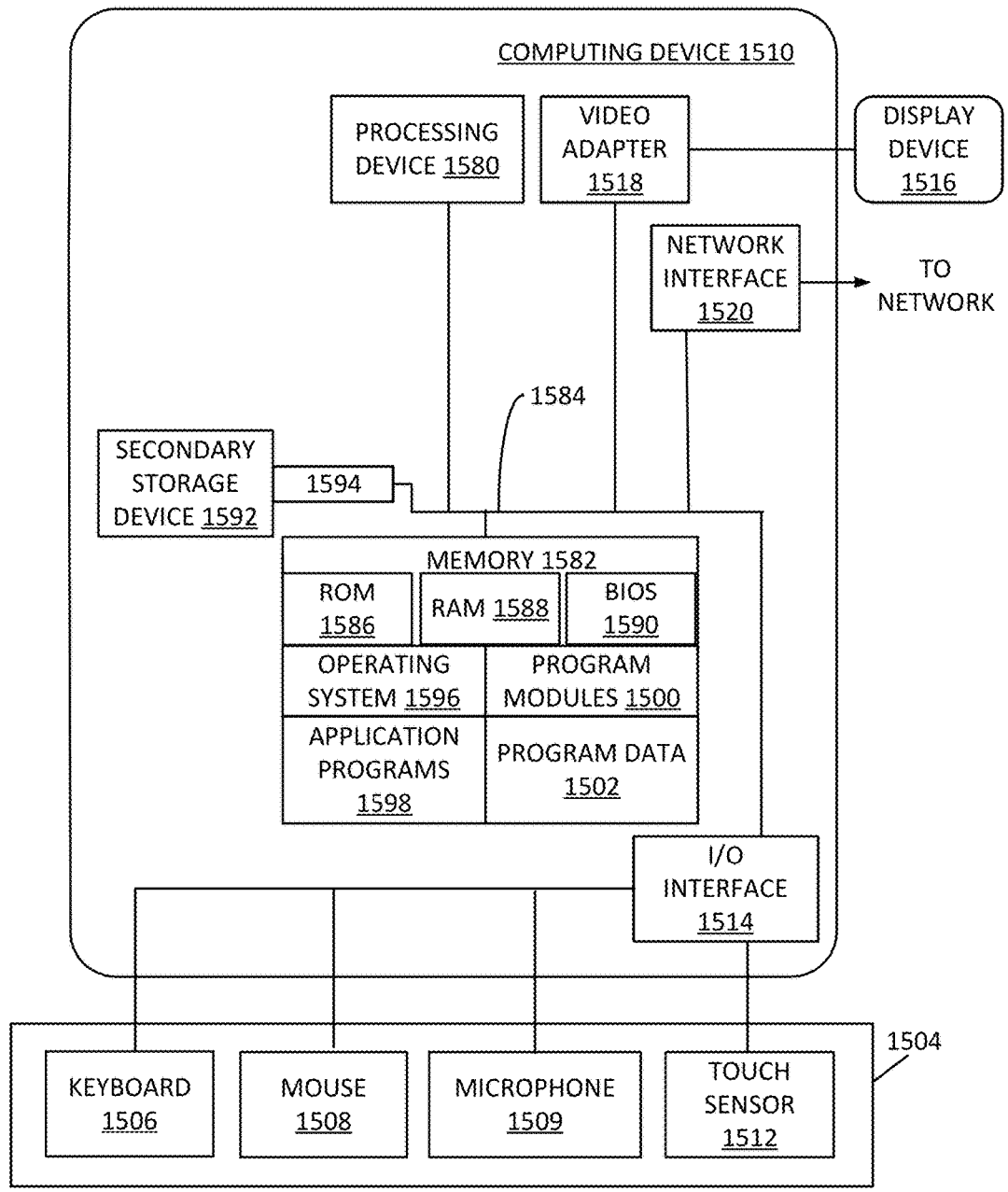
FIG. 15 is a block diagram illustrating example physical components of a computing device with which aspects of the disclosure may be practiced.

FIG. 15 illustrates one aspect in which an exemplary architecture of a computing device according to the disclosure that can be used to implement aspects of the present disclosure, including any of the plurality of computing devices described herein with reference to the various figures and their corresponding descriptions. The computing device illustrated in FIG. 15 can be used to execute the operating system, application programs, and software modules (including the software engines) described herein, for example, with respect to FIG. 16 and program modules 1614, data reception module 1616, SONAR module 1618, GPS module 1620, water level determination module 1622, accuracy determination engine 1624 and contour map updating engine 1626. By way of example, the computing device will be described below as the water contour map updating computing device 1510. To avoid undue repetition, this description of the computing device will not be separately repeated herein for each of the other computing devices, including computing device 302 (depicted in FIG. 3), computing device 402 (depicted in FIG. 4), computing device 502 (depicted in FIG. 5), computing devices 1302A-F (depicted in FIG. 13), computing devices 1418A-C (depicted in FIG. 14), and computing device 1600 (depicted in FIG. 16) but such devices can also be configured as illustrated and described with reference to FIG. 15.

The computing device 1510 includes, in some embodiments, at least one processing device 1580, such as a central processing unit (CPU). A variety of processing devices are available from a variety of manufacturers, for example, Intel, Advanced Micro Devices, and/or ARM microprocessors. In this example, the computing device 1510 also includes a system memory 1582, and a system bus 1584 that couples various system components including the system memory 1582 to the processing device 1580. The system bus 1584 is one of any number of types of bus structures including a memory bus, or memory controller; a peripheral bus; and a local bus using any of a variety of bus architectures.

Examples of computing devices suitable for the computing device 1510 include a server computer, a GPS/SONAR computer, a desktop computer, a laptop computer, a tablet computer, a mobile computing device (such as a smart phone, an iPod® or iPad® mobile digital device, or other mobile devices), or other devices configured to process digital instructions.

The system memory 1582 includes read only memory 1586 and random access memory 1588. A basic input/output system 1590 containing the basic routines that act to transfer information within computing device 1510, such as during start up, is typically stored in the read only memory 1586.

The computing device 1510 also includes a secondary storage device 1592 in some embodiments, such as a hard disk drive, for storing digital data. The secondary storage device 1592 is connected to the system bus 1584 by a secondary storage interface 1594. The secondary storage devices 1592 and their associated computer readable media provide nonvolatile storage of computer readable instructions (including application programs and program modules), data structures, and other data for the computing device 1510. Details regarding the secondary storage devices 1592 and their associated computer readable media, as well as their associated nonvolatile storage of computer readable instructions (including application programs and program modules) will be more fully described below with reference to FIG. 16.

Although the exemplary environment described herein employs a hard disk drive as a secondary storage device, other types of computer readable storage media are used in other aspects according to the disclosure. Examples of these other types of computer readable storage media include magnetic cassettes, flash memory cards, digital video disks, Bernoulli cartridges, compact disc read only memories, digital versatile disk read only memories, random access memories, or read only memories. Additional aspects may include non-transitory media. Additionally, such computer readable storage media can include local storage or cloud-based storage.

A number of program modules can be stored in secondary storage device 1592 or memory 1582, including an operating system 1596, one or more application programs 1598, other program modules 1500 (such as the software engines described herein), and program data 1502. The computing device 1510 can utilize any suitable operating system, such as Linux, Microsoft Windows™, Google Chrome™, Apple OS, and any other operating system suitable for a computing device.

According to examples, a user provides inputs to the computing device 1510 through one or more input devices 1504. Examples of input devices 1504 include a keyboard 1506, mouse 1508, microphone 1509, and touch sensor 1512 (such as a touchpad or touch sensitive display). Additional examples may include other input devices 1504. The input devices are often connected to the processing device 1580 through an input/output interface 1514 that is coupled to the system bus 1584. These input devices 1504 can be connected by any number of input/output interfaces, such as a parallel port, serial port, game port, or a universal serial bus. Wireless communication between input devices and the interface 1514 is possible as well, and includes infrared, BLUETOOTH® wireless technology, cellular and other radio frequency communication systems in some possible aspects.

In an exemplary aspect, a display device 1516, such as a monitor, liquid crystal display device, projector, or touch sensitive display device, is also connected to the system bus 1584 via an interface, such as a video adapter 1518. In addition to the display device 1516, the computing device 1510 can include various other peripheral devices (not shown), such as speakers or a printer.

When used in a local area networking environment or a wide area networking environment (such as the Internet), the computing device 1510 is typically connected to a network such as network 1320 shown in FIG. 13 and network 1415 shown in FIG. 14 through a network interface 1520, such as an Ethernet interface. Other possible embodiments use other communication devices. For example, certain aspects of the computing device 1510 may include a modem for communicating across the network.

The computing device 1510 typically includes at least some form of computer readable media. Computer readable media includes any available media that can be accessed by the computing device 1510. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 1510. Computer readable storage media does not include computer readable communication media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 15 is also an example of programmable electronics, which may include one or more such computing devices, and when multiple computing devices are included, such computing devices can be coupled together with a suitable data communication network so as to collectively perform the various functions, methods, or operations disclosed herein.

Figure 16:
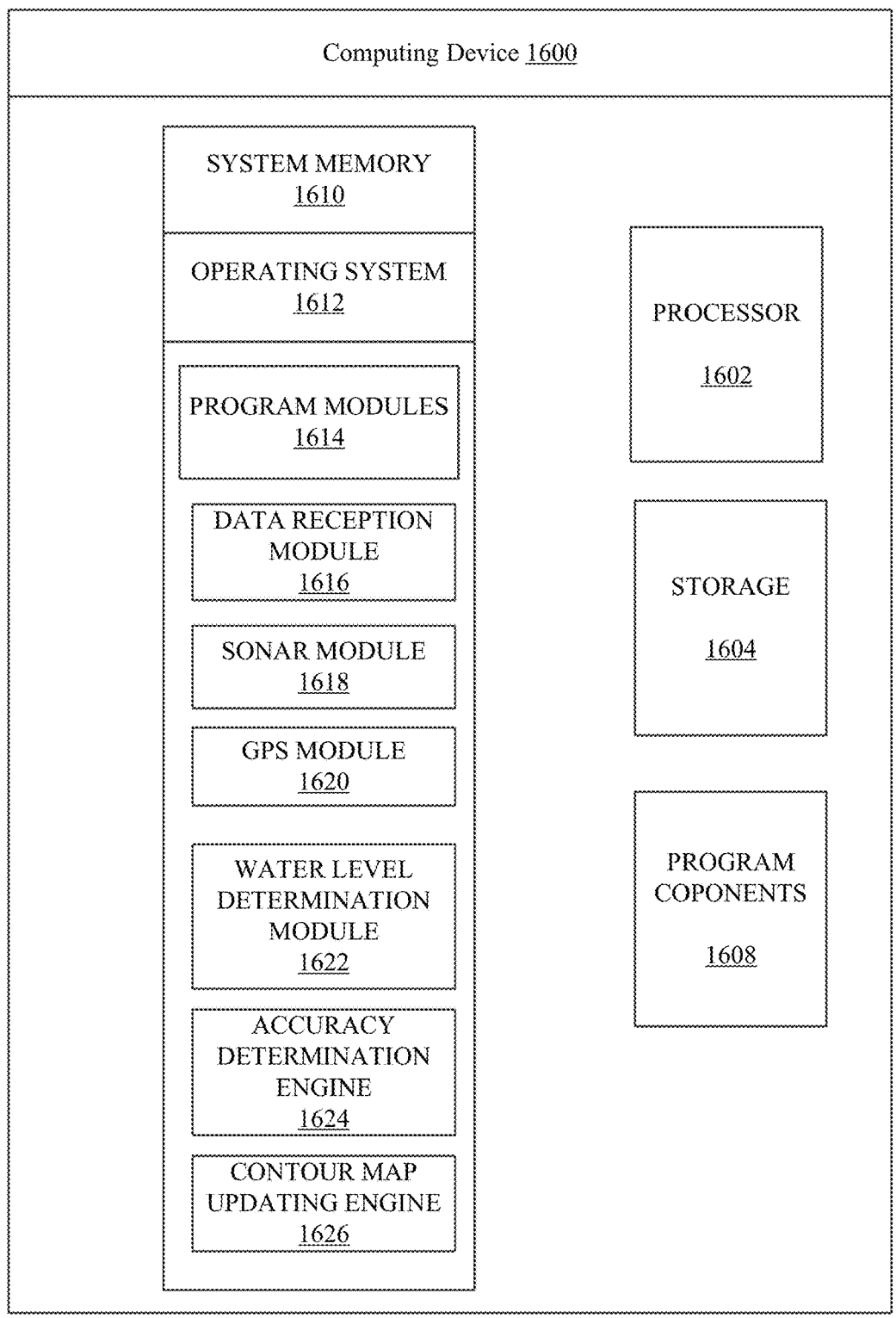
FIG. 16 is a block diagram illustrating physical components (e.g., hardware) of a computing device 1600 with which aspects of the disclosure may be practiced.

FIG. 16 is a block diagram illustrating additional physical components (e.g., hardware) of a computing device 1600 with which certain aspects of the disclosure may be practiced. The computing device components described below may have computer executable instructions for determining a first water level for a body of water, identifying a location within the body of water, determining a first water level relating to the identified location within the body of water, determining a second water level relating to the identified location within the body of water, comparing the second water level for the identified location and the first water level for the body of water; and/or comparing the second water level relating to the first identified location and the first water level relating to the identified location within the body of water, and updating a water depth contour map for the body of water. In addition, the computing device components described below may have computer executable instructions for determining a baseline water level for a body of water, receiving a plurality of depth and/or altitude readings for a location on the body of water, determining which of the depth and/or altitude readings are most accurate, comparing the most accurate depth altitude readings with the baseline water level for the body of water, and automatically updating a contour map for a body of water. Computing device 1600 may perform these functions alone or in combination with a distributed computing network such as those described with regard to FIGS. 13 and 14 which may be in operative contact with personal computing device 1418A, tablet computing device 1418B and/or mobile computing device 1418C which may communicate and process one or more of the program modules described in FIG. 16 including data reception module 1616, sonar module 1618, GPS module 1620, water level determination module 1622, accuracy determination engine 1624, and contour map updating engine 1626. According to additional examples, computing device 1600 may be in communicative contact via the distributed computing networks described in FIGS. 13 and 14 and computing device 1600 may comprise and describe any of components 1302A, 1302B, 1302C, 1302D, 1302E and 1302F. Additionally, computing device 1600 may represent computing devices 302, 402 and/or 502 with regard to the descriptions provided for FIGS. 3, 4 and 5, and/or computing device 1510 as described above with regard to FIG. 15.

In a basic configuration, the computing device 1600 may include at least one processor 1602 and a system memory 1610. Depending on the configuration and type of computing device, the system memory 1610 may comprise, but is not limited to, volatile storage (e.g., random access memory), non-volatile storage (e.g., read-only memory), flash memory, or any combination of such memories. The system memory 1610 may include an operating system 1612 and one or more program modules 1614 suitable for performing dynamic updating of contour maps for bodies of water, such as one or more components in regards to FIG. 16 and, in particular, data reception module 1616, SONAR module 1618, GPS module 1620, water level determination module 1622, accuracy determination engine 1624, and contour map updating engine 1626. The operating system 1612, for example, may be suitable for controlling the operation of the computing device 1600. Furthermore, aspects of the disclosure may be practiced in conjunction with a graphics library, other operating systems, or any other application program and are not limited to any particular application or system.

The computing device 1600 may have additional features or functionality. For example, the computing device 1600 may also include additional data storage device (removable and/or non-removable) such as, for example, magnetic disks, optical disks, or tape. Such additional storage is illustrated in FIG. 16 by storage 1604. It will be well understood by those of skill in the art that storage may also occur via the distributed computing networks described in FIG. 13 and FIG. 14. For example, computing device 1600 may communicate via network 1320 in FIG. 13 and data may be stored within network servers 1306 and transmitted back to computing device 1600 via network 1320 if it is determined that such stored data is necessary to execute one or more functions described herein. Additionally, computing device 1600 may communicate via network 1415 in FIG. 14 and data may be stored within server 1420 and transmitted back to computing device 1600 via network 1415 if it is determined that such stored data is necessary to execute one or more functions described herein.

As stated above, a number of program modules and data files may be stored in the system memory 1610. While executing the processor 1602, the program modules 1614 (e.g., data reception module) may perform processes including, but not limited to, the aspects described herein. Other program modules that may be used in accordance with aspects of the present disclosure, and in particular may include a tide prediction engine; a future water level prediction engine; a cellular data processing module; a WIFI reception, transmission, and processing engine; and a wave fluctuation averaging engine.

The various examples described above are provided by way of illustration only and should not be construed to limit the claims attached hereto. Those skilled in the art will readily recognize various modifications and changes that may be made without following the various aspects, examples and applications illustrated and described herein, and without departing from the true spirit and scope of the following claims.

What is claimed is:

1. A method for dynamically updating a contour map associated with a body of water, the contour map including g water depth values for the body of water, the method comprising:

using at least one processor:
loading a pre-existing contour map of the body of water, the pre-existing contour map including a water depth value at a plurality of positions within the body of water;
displaying a graphical user interface including a selectable control that is selectable by a user via a user input device to selectively enable and disable an automatic contour map update function on a display;
determining that the selectable control has been selected to enable the automatic contour map update function;
measuring a position on the body of water using a position sensor, the position also being included within the pre-existing contour map;
measuring a current depth of the body of water at the position using a depth sensor;

extracting a depth value of the body of water indicated by the pre-existing contour map at the position;

determining a difference between the depth of the body of water indicated by the pre-existing contour map at the position and the current depth of the body of water at the position, the difference representative of a physical change in the depth of the body of water at the position and at least one other position;

automatically updating the pre-existing contour map to indicate the physical change, including updating the water depth values of the pre-existing contour map by shifting at least the water depth values at the position and the at least one other position by the determined difference; and displaying the updated contour map including the updated water depth values in the graphical user interface.

2. The method of claim 1, wherein automatically updating the pre-existing contour map and displaying the updated contour map occurs in real time.

3. The method of claim 1, wherein the at least one processor, the display, the position sensor, and the depth sensor are located on a water vessel that is located on the body of water.

4. The method of claim 3, further comprising:
determining a minimum depth safe for the water vessel to traverse;
extracting one or more alert positions in the updated contour map for which the updated water depth value is less than the minimum depth safe for the water vessel to traverse;
displaying, in the graphical user interface, an alert area in the updated contour map corresponding to the one or more alert positions.

5. The method of claim 4, further comprising:
receiving, from user input into the graphical user interface via the user input device, a waypoint position included in the body of water;
based on the one or more alert positions in the updated contour map, determining a safe route on the body of water for the water vessel to traverse from the current GPS position to the waypoint position; and
displaying the safe route in the graphical user interface on the display.

6. The method of claim 5, further comprising automatically navigating and steering the water vessel along the safe route to the waypoint position.

7. A system comprising:
at least one processor;
a global positioning system (GPS);
a SONAR system;
a display;
a user input device configured to receive input from a user;
a database storing a pre-existing contour map for a body of water, the pre-existing contour map including water depth values for the body of water;
a memory operatively connected to the at least one processor, the memory comprising computer executable instructions that, when executed by the at least one processor, cause the processor to:
display a graphical user interface on the display;
display a settings menu in the graphical user interface on the display, the settings menu including a selectable control that is selectable by a user via the user input device to selectively enable and disable an automatic contour update function;

load the pre-existing contour map of the body of water from the database;
determine whether the automatic contour update function is enabled using the processing device;
when determined that the automatic contour update function is enabled:
measure a current GPS position on the body of water using the GPS, the current GPS position being included within the pre-existing contour map;
measure a current depth of the body of water at the current GPS position using the SONAR system;
extract a depth of the body of water indicated by the pre-existing contour map at the current GPS position;
determine a difference between the depth of the body of water indicated by the pre-existing contour map at the current GPS position and the current depth of the body of water at the current GPS position, the difference representative of a physical change in the depth of the body of water at the position and at least one other position;
automatically update the pre-existing contour map to indicate the physical change, including updating the water depth values for the contour map by shifting at least the water depth values at the position and the at least one other position by the difference;
display the updated contour map including the updated water depth values in the graphical user interface on the display; and
when determined that the automatic contour update function is disabled:
display the pre-existing contour map.

8. The system of claim 7, wherein the pre-existing contour map is a previously updated contour map.

9. A navigation system for a water vessel, the navigation system comprising:
at least one processor;
a global positioning system (GPS) receiver;
a SONAR system including a SONAR transducer that transmits and receives sound signals;
a display;
a user input device configured to receive input from a user;
at least one data storage device storing a pre-existing contour map for a body of water, the pre-existing contour map including water depth values for the body of water;
wherein the at least one data storage device further stores data instructions, which when executed by the at least one processor, cause the at least one processor to:
display a graphical user interface on the display;
display a settings menu in the graphical user interface on the display, the settings menu including a selectable control that is selectable by a user via the user input device to enable and disable an automatic contour update function;
load the pre-existing contour map of the body of water from the at least one data storage device;
determine whether the automatic contour update function is enabled using the processing device;
when determined that the automatic contour update function is enabled:
measure a current GPS position on the body of water by detecting GPS signals with the GPS receiver and processing data encoded in the satellite signals, the current GPS position being included within the pre-existing contour map;
measure a current depth of the body of water at the current GPS position using the SONAR system by transmitting a sound signal from the SONAR transducer into the body of water, detecting with the SONAR transducer an echo of the sound signal, and processing the detected sound signal to determine the current depth;
extract a depth indicated by the pre-existing contour map at the current GPS position;
determine a difference between the depth of the body of water indicated by the pre-existing contour map at the current GPS position and the measured current depth of the body of water at the current GPS position, the difference representative of a physical change in the depth of the body of water at the current GPS position and at least one other position included in the pre-existing contour map;
automatically update the pre-existing contour map to indicate the physical change, including updating the water depth values for the contour map by shifting at least the water depth values at the current GPS position and the at least one other position included in the pre-existing contour map by the difference;
display the updated contour map including the updated contour depth values in the graphical user interface on the display; and
when determined that the automatic contour update function is disabled:
display the pre-existing contour map.

10. The system of claim 9, wherein when determined that the automatic contour update function is enabled, further cause the at least one processor to:
determine a minimum depth safe for the water vessel to traverse;
extract one or more alert positions in the updated contour map for which the updated water depth value is less than the minimum depth safe for the water vessel to traverse; and
display, in the graphical user interface on the display, an alert area in the updated contour map corresponding to the one or more alert positions.

11. The method of claim 10, wherein the data instructions, when determined that the automatic contour update function is enabled, further cause the at least one processor to:
receive, from user input into the graphical user interface via the user input device, a waypoint position on the body of water; and
based on the one or more alert positions in the updated contour map, determine a safe route on the body of water for the water vessel to traverse from the current GPS position to the waypoint position;
display the safe route in the graphical user interface on the display; and
automatically navigate and steer the water vessel along the safe route to the waypoint position.

12. A water vessel comprising:
a body;
a motor supported by the body;
a navigation system supported by the body, the navigation system comprising:
at least one processor;
a global positioning system (GPS) receiver;
a SONAR system including a SONAR transducer that transmits and receives sound signals;
a display;
a user input device configured to receive input from a user;
at least one data storage device storing a pre-existing contour map for a body of water, the pre-existing contour map including water depth values for the body of water;
wherein the at least one data storage device further stores data instructions, which when executed by the at least one processor, cause the at least one processor to:
display a graphical user interface on the display;
display a settings menu in the graphical user interface on the display, the settings menu including a selectable control that is selectable by a user via the user input device to enable and disable an automatic contour update function;
load the pre-existing contour map of the body of water from the at least one data storage device;
when determined that the automatic contour update function is enabled:
measure a current GPS position on the body of water by detecting GPS signals with the GPS receiver and processing data encoded in the satellite signals, the current GPS position being included within the pre-existing contour map;
measure a current depth of the body of water at the current GPS position using the SONAR system by transmitting a sound signal from the SONAR transducer into the body of water, detecting with the SONAR transducer an echo of the sound signal, and processing the detected sound signal to determine the current depth;
extract a depth indicated by the pre-existing contour map at the current GPS position;
determine a difference between the depth of the body of water indicated by the pre-existing contour map at the current GPS position and the measured current depth of the body of water at the current GPS position, the difference representative of a physical change in the depth of the body of water at the current GPS position and at least one other position included in the pre-existing contour map;
automatically update the pre-existing contour map to indicate the physical change, including updating the water depth values for the contour map by shifting at least the water depth values at the current GPS position and the at least one other position included in the pre-existing contour map by the difference;
display the updated contour map including the updated contour depth values in the graphical user interface on the display; and
when determined that the automatic contour update function is disabled:
display the pre-existing contour map.

13. The water vessel of claim 12, wherein when determined that the automatic contour update function is enabled, further cause the at least one processor to:
determine a minimum depth safe for the water vessel to traverse;
extract one or more alert positions in the updated contour map for which the updated water depth value is less than the minimum depth safe for the water vessel to traverse; and display, in the graphical user interface on the display, an alert area in the updated contour map corresponding to the one or more alert positions.

\* \* \* \* \*

UNITED STATES PATENT AND TRADEMARK OFFICE
CERTIFICATE OF CORRECTION

PATENT NO. : 10,371,816 B2  
APPLICATION NO. : 14/983996  
DATED : August 6, 2019  
INVENTOR(S) : Sean Seifert et al.

Page 1 of 1

It is certified that error appears in the above-identified patent and that said Letters Patent is hereby corrected as shown below:

In the Drawings

Sheet 16 of 16: "PROGRAM COPNENTS" should read --PROGRAM COMPONENTS--

In the Specification

Column 5, Lines 54-55: "depth and or altitude water levels" should read --depth and/or altitude water levels--

Column 8, Line 28: "AUTO COUNTOUR UPDATES" should read --AUTO CONTOUR UPDATES--

In the Claims

Column 17, Line 45, Claim 11: "The method of claim 10," should read --The system of claim 10,--

Signed and Sealed this  
Ninth Day of February, 2021

Drew Hirshfeld  
*Performing the Functions and Duties of the*  
*Under Secretary of Commerce for Intellectual Property and*  
*Director of the United States Patent and Trademark Office*